Nov. 28, 1950 M. L. DOELZ 2,531,935

LEVEL-STABILIZED MODULATED CARRIER AMPLIFIER

Filed Dec. 14, 1945

INVENTOR.
MELVIN L. DOELZ
BY
John J. Rogan
ATTORNEY

Patented Nov. 28, 1950 2,531,935

UNITED STATES PATENT OFFICE 2,531,935

LEVEL-STABILIZED MODULATED CARRIER AMPLIFIER

Melvin L. Doelz, Minneapolis, Minn., assignor to Collins Radio Company, Cedar Rapids, Iowa, a corporation of Iowa Application December 14, 1945, Serial No. 635,087

10 Claims. (Cl. 250—20)

This invention relates to modulated carrier wave amplifiers such for example as radio frequency amplifiers used in radio receivers and the like, and more especially to methods and circuit arrangements for stabilizing, without distortion, the output level of such amplifiers.

A principal object of the invention is to provide a novel level control arrangement for a modulated carrier amplifier.

Another object is to provide an improved level control arrangement for a modulated carrier signalling system of the kind employing automatic volume control, and wherein the inherent distorting effects of high automatic volume control potentials are substantially reduced, if not entirely eliminated.

Another object is to provide an improved radio frequency amplifier having its input circuit supplied with an automatic volume control potential, and wherein the apparent modulating effect of such potential on the radio frequency carrier passing through the amplifier, is neutralized.

A further object is to provide an improved level-controlled radio frequency amplifier which is singularly free from distortion resulting from self-modulation rise, and from the distortion resulting from "cross modulation" between two or more applied modulated carrier waves.

A feature of the invention relates to a modulated carrier wave amplifier of the level-controlled type, having means to derive from the D. C. plate currents thereof a compensating audio frequency voltage for application to the input circuit so as to overcome the undesirable effects of a high value of applied automatic volume control potential.

A further feature relates to an improved radio receiver of the automatic volume control type wherein signal distortion tending to arise when abnormal input carrier wave levels are received, are compensated for.

A still further feature relates to the novel organization, arrangement and relative interconnection of parts which cooperate to produce an improved level-controlled radio frequency amplifier.

Inasmuch as the invention is concerned primarily with the radio frequency stage or stages of a carrier wave signalling system, only those parts of such a system are shown in detail as are necessary to an understanding of the inventive concept and one practical embodiment thereof.

When a modulated carrier wave is amplified by a device such as a grid-controlled radio frequency amplifier tube having a non-linear relation between input voltage and output current, the percent of modulation in the amplified output carrier tends to rise as compared with the percent of modulation of the input carrier. Percent modulation is defined as the ratio of half the difference between the maximum and minimum amplitudes of a carrier wave to the average amplitude thereof impressed in percent. In order to reproduce signal modulations with faithfulness, it is desirable to maintain the same percent of modulation at the output as exists at the input of the radio frequency system. When the radio frequency amplifier always operates on the linear portion of its grid voltage-plate current characteristic, the likelihood of a change in percent modulation is rather slight. However, if, for any reason the radio frequency amplifier is required to operate on the bend or non-linear portion of its characteristic curve, there is always the possibility of an undesirable change in the percent of modulation.

One reason why a radio frequency amplifier may have to operate on the non-linear portion of its characteristic curve, is the presence of an abnormally high automatic volume control voltage which is applied to the input circuit of the amplifier and derived from a subsequent portion of the system. The action of a radio frequency amplifier which is subjected to modulation rise, is similar to that of a biased triode operating as a detector. In other words, there is present in the output of the radio frequency amplifier a demodulated audio frequency voltage component. If the radio frequency amplifier is of the self-biasing type, this audio frequency component has a large bias value and is at relatively high signal level. This audio frequency component of plate voltage is superimposed upon the radio frequency output of the amplifier and results in an increased percent of modulation, with its concomitant signal distortion. The distortion is aggravated in the case of self-biased radio frequency amplifiers e. g., those employing a cathode bias resistor, since the audio frequency component so far as the biasing action is concerned, causes a shift in the operating point towards the bend of the characteristic curve in the same way that the high automatic voume control voltage does.

Another form of distortion encountered in modulated radio frequency amplifiers in the presence of a strong radio frequency signal to which the amplifier input is tuned is that referred to as "cross modulation." The effects of this "cross modulation" in distorting the detected signal output are analogous to those above described when high automatic volume control potentials are encountered. Consequently, the arrangements according to the present invention are equally effective in the presence either of cross modulation or in percent modulation rise.

Figure 1:
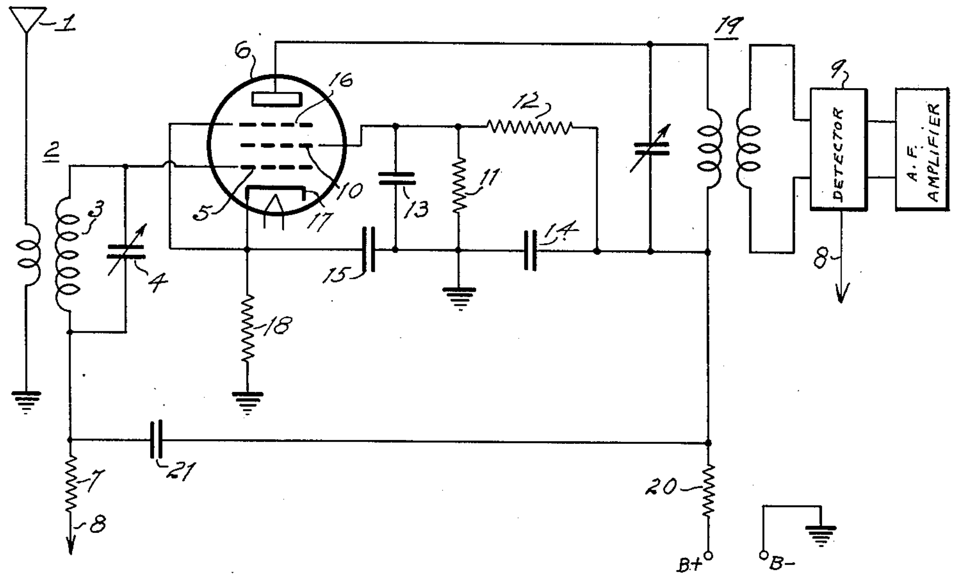
Fig. 1 is a schematic circuit and block diagram illustrating a conventional radio receiver in which the invention is incorporated.

Referring to Fig. 1, there is shown in schematic form, a typical radio receiving system comprising for example a receiving antenna 1, which is connected to the radio frequency transformer 2. The radio frequency high potential end of the tuned circuit comprising the secondary 3 and variable condenser 4, is connected to the control grid 5 of any suitable radio frequency amplifying tube 6 which, for example, may be a radio frequency pentode of the type 12SG7 or any other tube having similar characteristics. The radio frequency lower potential end of the tuned input circuit is returned to ground over resistor 7 and the automatic volume control conductor 8, through the usual automatic volume control detector (not shown) connected for example in the detector stage 9 of the receiver, as is well-known either in connection with the tuned radio frequency type of receiver or in the superheterodyne type of receiver.

In the conventional way, the shield grid 10 is supplied wtih the proper positive D. C. potential by means of the voltage divider resistors 11, 12, each of approximately 100,000 ohms, these resistors having suitable by-pass condensers 13, 14, 15, for the radio frequency components and these condensers being each approximately .01 mfd. The suppressor grid 16 is, in the usual way, connected direct to cathode 17 which is returned to ground through a cathode biasing resistor 18 of approximately 470 ohms.

The amplified output of tube 6 is coupled to the succeeding stage 9 by a suitable radio frequency transformer 19. In the case of a tuned radio frequency receiver, the stage 9 may represent the usual detector stage. If the receiver is of the superheterodyne type, a suitable frequency converting stage and one or more intermediate frequency amplifier stages will be interposed between transformer 19 and the detector 9. In either case, there is derived from the detected carrier an automatic volume control voltage which is applied over conductor 8 in series with the resistor 7 to the tuned input circuit of tube 6. This automatic volume control voltage is such as to increase the negative bias on grid 5 in proportion to an increase in the level of the detected output, which of course is dependent upon the level of the radio frequency signals applied to transformer 2 to grid 5.

Figure 2:
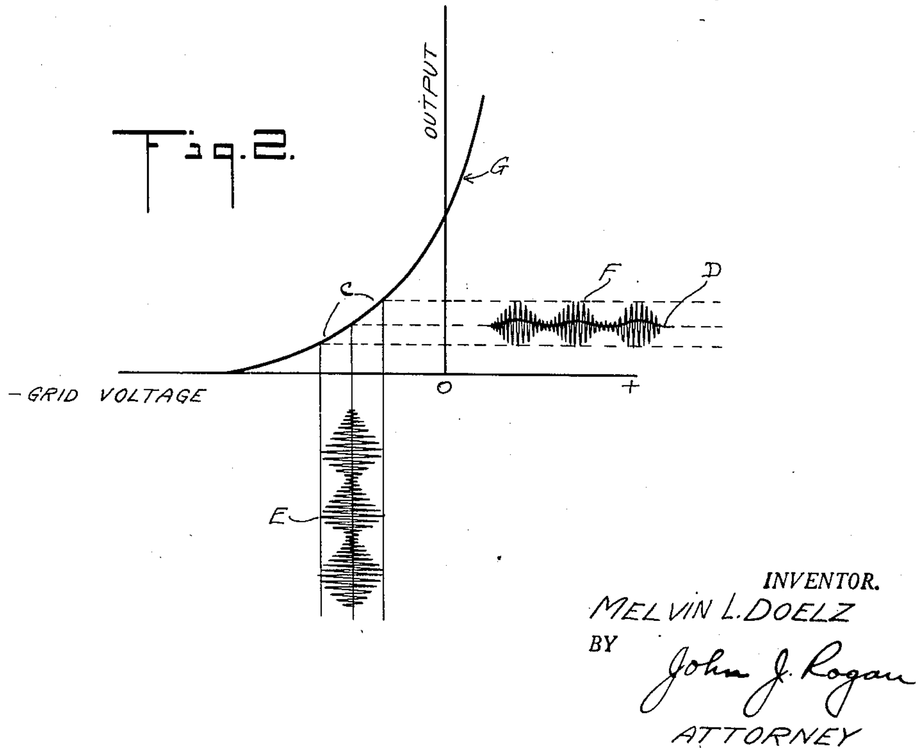
Fig. 2 is a set of graphs explanatory of certain aspects of the invention.

When the radio frequency input signals are of very high level, there is applied to grid 5 over conductor 8 a corresponding high negative potential causing the tube 6 to shift its operating point to a region C on the bend of the characteristic curve (Fig. 2). As a result, the tube 6 to a certain extent acts in the nature of a biased detector and there appear across the resistor 20 demodulated audio frequency components which are represented by the full line curve D (Fig. 2). Resistor 20 is connected in series between the positive terminal B plus of the plate power supply and the primary winding of transformer 19, and may be of approximately 22,000 ohms. As pointed out above, one of the effects of these audio frequency components in the plate circuit of tube 6 is to increase the apparent percent of modulation in the signals which are passed on to the detector stage 9.

In accordance with the present invention, the undesirable audio frequency voltages which appear across resistor 20 are fed back to the grid circuit of tube 6 through a condenser 21 of approximately 0.01 mfd. This fed-back audio frequency voltage is approximately 180° out-of-phase with the radio frequency input envelope E as applied to grid 5 and thereby cancels out the conditions which tend to cause the above described percent modulation rise.

Fig. 2 represents the dynamic operating characteristics of tube 6 when a large negative automatic volume control bias is applied over conductor 8. Curve G shows the relation between control grid voltage, and output voltage in the amplifier when subjected to the conditions tending to produce modulation rise. The curve E represents the input carrier wave envelope of radio frequency modulated at some audio frequency signal rate. The curve F represents the output radio frequency envelope. The average value of the radio frequency output envelope F has audio frequency fluctuations as indicated by curve D. This audio frequency voltage is fed back to the grid circuit of tube 6 in an out-of-phase relationship so as to cancel-out the variations tending to produce modulation rise and resulting in substantial distortionless radio frequency amplification.

While one particular manner of practising the invention has been disclosed, it will be understood that various changes and modifications may be made therein without departing from the spirit and scope of the invention.

What is claimed is:

1. In combination, a signal modulated high frequency carrier wave amplifier, said amplifier having a control-grid voltage and plate current characteristic with a linear section and with a non-linear section, means to apply an automatic volume control direct current voltage to the control grid of said amplifier, means to adjust said amplifier so that for low magnitudes of said automatic volume control voltage it operates on said linear section, and means effective when said amplifier operates on said non-linear section as a result of application of high magnitude automatic volume control voltages, to compensate for distortion which tends to rise from the corresponding undesired demodulator action of said amplifier, the last-mentioned means including circuit arrangements for feeding back in reverse phase to the input of the amplifier a portion of the undesired demodulated audio frequency voltages in the output of the said amplifier.

2. In combination, a carrier high frequency wave amplifier, means to apply signal modulated carrier high frequency waves to the input of said amplifier, means to apply to a control electrode of said amplifier a direct current level control voltage derived from the detected output of said amplifier, and means also to apply to said control electrode an audio frequency voltage derived from undesired demodulated voltages in the plate current of said amplifier to compensate for any distortion tending to be produced by high values of said applied direct current level control voltage, which high values of level control voltage tend to produce said undesired demodulation voltages.

3. A radio receiving system comprising a radio frequency amplifier tube, means to apply signal modulated carrier waves to the input of said tube, a detector for detecting said modulations, means to derive from the detected signal a direct current level control voltage, means to apply said level control voltage to a control grid of said amplifier tube, a resistance connected in the plate circuit of said amplifier tube, and a connection from said resistance to the input circuit of said amplifier tube for applying to said input circuit a voltage derived from undesired demodulated audio frequency voltage in the plate circuit of said amplifier for the purpose of overcoming the distortion effect of cross modulation at the input of said tube.

4. A modulated carrier wave receiving system, comprising, a high frequency carrier wave amplifier having at least one input control grid to which an audio frequency signal-modulated carrier wave is applied, means normally biassing said amplifier so that it acts to amplify said modulated carrier without any substantial demodulation of the carrier modulations, an automatic volume control detector for producing a direct current automatic volume control voltage, means to apply said automatic volume control voltage to the input of said amplifier to control the bias on said grid, means for deriving directly from the plate circuit of said amplifier an audio frequency voltage when said automatic volume control voltage is above a level which causes said amplifier to act partially as a demodulator, and means for applying said demodulated audio frequency voltage to the input of said amplifier to overcome the distortion in the detected audio frequency output of the system which tends to arise by the undesired demodulating action of said amplifier.

5. In combination, a signal-modulated high-frequency carrier wave amplifier, means normally biassing an input electrode of said amplifier to cause it normally to operate on the linear portion of its control grid and plate current characteristic, means to derive a direct current level-control voltage from the detected output of said amplifier, means to apply said level-control voltage to said input electrode said level-control voltage when above a certain level causing said amplifier to operate on the non-linear portion of its said characteristic curve and thereby tending to act as an undesired demodulator of the signal modulations, and means to apply to said input electrode a portion of the undesired signal demodulated voltages to neutralize the distortion tending to arise when said level-control voltage is above said certain level.

6. In combination, a signal-modulated radio-frequency carrier wave amplifier, means to apply to the input electrodes of said amplifier signal-modulated radio-frequency carrier waves with a certain per cent modulation, means to derive a direct current level-control voltage from the output circuit of the amplifier, means to apply said level-control voltage to one of said input electrodes said level-control voltage when above a certain level tending to change the per cent modulation in the carrier at the amplifier output, means to derive a signal-demodulated voltage at the output of the amplifier, and means to apply said signal-demodulated voltage to one of said input electrodes to maintain the per cent modulation at the amplifier output substantially the same as at the input.

7. In combination, a signal-modulated radio-frequency carrier wave amplifier, means to apply to a control grid of said amplifier signal-modulated radio-frequency carrier waves having a certain per cent of modulation, means to derive from the detected output of said amplifier a direct current level-control voltage, means to apply said level-control voltage to said control grid said level-control voltage when above a certain level tending to cause a change in per cent modulation at the amplifier output as compared with the amplifier input and producing undesired signal-demodulated voltages at said output circuit, and means to apply said demodulated voltages to said control electrode to oppose change in said certain per cent modulation.

8. In combination, a radio frequency amplifier tube, means to apply signal-modulated radio-frequency carrier waves to a control grid of said tube, means to derive from the detected output of the amplifier a negative direct current level-control voltage, means to apply said level-control voltage to said control grid said level-control voltage when above a certain level causing an undesired audio-frequency signal demodulation component to appear in the plate circuit of said amplifier, and means to apply to said control grid a portion of said demodulated signal component to overcome the tendency to change in the modulation per cent of the amplifier output resulting from a level-control voltage above said certain level.

9. In combination, a radio-frequency amplifier tube, means to derive from the detected output of said tube a direct current level-control voltage, means to apply said level-control voltage to the control grid of said tube, said level-control voltage when above a certain level tending to cause said tube to act undesirably and partially as a demodulator and thereby producing in the amplifier output an undesired signal demodulation voltage, and means to apply a portion of the said undesired signal demodulation voltage to the input circuit of the amplifier to neutralize the distortion tending to arise by said undesired demodulation action.

10. A radio-frequency amplifier, comprising, a grid-controlled electron tube, means to apply to the control grid of said tube a signal-modulated radio-frequency carrier voltage, means to derive a negative direct-current level-control voltage from the detected output of the amplifier, means to apply said level control voltage to said control grid, means to derive at the output of the amplifier, a third voltage representing undesired signal demodulations in the output of the amplifier produced by said level control voltages above a certain level, means to apply said third voltage to said control grid and in out-of-phase relation with respect to the modulation envelope of the carrier wave voltages applied to said control grid for overcoming distortion effects tending to arise from the presence of said level-control voltage above said certain level.

MELVIN L. DOELZ.

REFERENCES CITED

The following references are of record in the file of this patent:

UNITED STATES PATENTS

| Number | Name | Date |
|---|---|---|
| 1,997,407 | Hofer | Apr. 9, 1935 |
| 2,035,289 | Bartels | Mar. 24, 1936 |
| 2,167,405 | Longhren | July 25, 1939 |
| 2,199,350 | Shofstall | Apr. 30, 1940 |
| 2,237,421 | Foster | Apr. 8, 1941 |
| 2,271,291 | Edson | Jan. 27, 1942 |
| 2,273,096 | Foster | Feb. 17, 1942 |
| 2,314,813 | Bond | Mar. 23, 1943 |
| 2,334,468 | Adams | Nov. 16, 1943 |

FOREIGN PATENTS

| Number | Country | Date |
|---|---|---|
| 818,989 | France | Oct. 17, 1937 |